United States Patent [19]
Boffito et al.

[11] Patent Number: 5,180,568
[45] Date of Patent: Jan. 19, 1993

[54] RECOVERY OF TRITIUM AND DEUTERIUM FROM THEIR OXIDES AND INTERMETALLIC COMPOUND USEFUL THEREIN

[75] Inventors: Claudio Boffito; Massimo Bolognesi, both of Milan, Italy

[73] Assignee: SAES Getters SpA, Milan, Italy

[21] Appl. No.: 704,874

[22] Filed: May 23, 1991

[30] Foreign Application Priority Data

Jun. 1, 1990 [IT] Italy ................... 20509 A/90

[51] Int. Cl.$^5$ ............... C01B 3/56; C01B 4/00
[52] U.S. Cl. ................. 423/248; 423/249; 423/647.7
[58] Field of Search ............ 423/249, 647.7, 248

[56] References Cited

U.S. PATENT DOCUMENTS 4,634,454  1/1987  Khan et al. ............ 423/647.7
4,743,167  5/1988  Martelli et al. ......... 423/647.7

FOREIGN PATENT DOCUMENTS 1-80223  7/1989  Japan ..................... 423/248

*Primary Examiner*—Wayne Langel
*Attorney, Agent, or Firm*—David R. Murphy

[57] ABSTRACT

There is described a process for the recovery of deuterium and tritium from their oxides, such has heavy water and tritiated water, comprising the steps of reacting the oxides of deuterium and tritium with an intermetallic compound having a formula $ZrM_2$, where M is a transition metal chosen from the group comprising Cr, Mn, Fe, Co and Ni such that it sorbs oxygen and released deuterium and tritium. The reaction preferably occurs by contacting the impure gas with the $ZrM_2$ alloy as defined above, in the form of a compressed powder. A preferred alloy is the intermetallic ternary compound ZrMnFe.

12 Claims, 2 Drawing Sheets

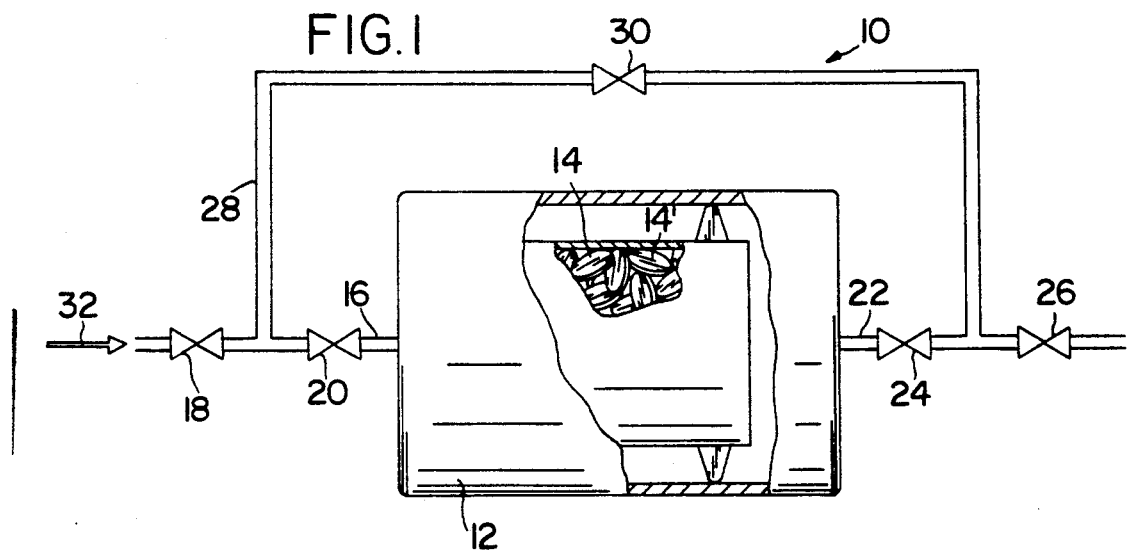
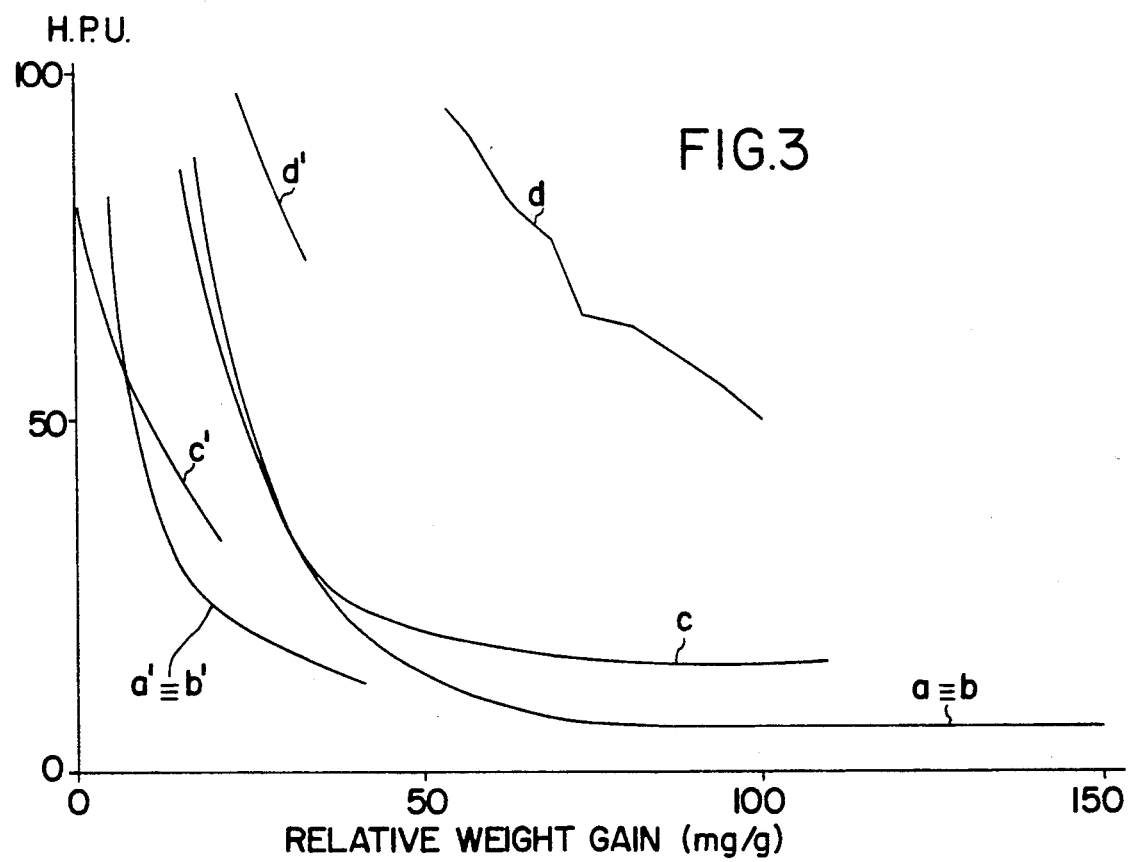

RECOVERY OF TRITIUM AND DEUTERIUM FROM THEIR OXIDES AND INTERMETALLIC COMPOUND USEFUL THEREIN

BACKGROUND

Tritium is produced by many different nuclear reactions, mainly those involving neutrons, deuterons and protons. Tritium is also produced by the neutron irradiation of $^6$Li in fusion reactor blankets according to the reaction ($^6$Li+n $^4$He+T). This reaction is also exploited for energy production.

Since tritium, as well as deuterium, is a nuclear fuel, it is recovered and recycled in the fusion reactor. However the presence of impurities, mainly oxides of tritium and to a lesser extent, oxides of deuterium, formed as a results of the interaction of tritium with the internal surfaces of the system, is extremely detrimental for the re-use of the gas as a fuel in nuclear fusion. This requires purification of the impure tritium.

The oxides of tritium include $T_2O$ (tritiated water) and mixed compound such as TDO and THO. The oxides of deuterium include $D_2O$ (heavy water) and mixed oxides such a DTO and DHO.

Conventional techniques use physical adsorbents, such as molecular sieves, or zeolites, kept at cryogenic temperatures to condense these compounds. These oxides are then disposed of as nuclear waste or are treated by electrolytic processes or by thermal dissociation on iron grids at high temperature to recover tritium.

All these prior processes pose serious environmental problems due to the radioactivity of tritium and its compounds. Liquid $T_2O$ is particularly dangerous because the radioactivity is more concentrated in the liquid form than is the vapour form.

Intermetallic compounds of the type $ZrM_2$ are known in the literature. Specific articles on this subject can be found for example in the Journal of the Less-Common Metals, Vol. 53 (1977) p. 117-131 by D. Shaltiel, I. Jacobs and D. Davidov, Vol. 130 (1987) p. 25-31 by H. Fujii, M. Saga and T. Okamoto, as well as the Journal of Nuclear Materials, Vol. 170 (1990), p. 217-231 by R-D. Penshorn, M. Devillers and M. Sirch. See also U.S. Pat. No. 4,586,561 regarding these intermetallic compounds.

All the above literature refers to the good sorption characteristics for hydrogen of these compounds (and therefore of its isotopes).

BRIEF OBJECTS OF THE INVENTION

Accordingly it is an object of the present invention to provide an improved process for the recovery of tritium from its oxides (tritiated water) that does not suffer from the disadvantages of prior processes.

An additional object of the present invention is to provide an improved tritium recovery process which does not require the use of cryogenic temperatures nor the use of high temperatures for the concentration of tritiated water.

Another object of the present invention is to provide a process for the recovery of tritium in a low pressure gas stream wherein the oxides of tritium are present at partial pressures of less than about 50 Torr (~65 mbar).

Yet another object is to provide a safe, reliable process for recovering tritium from its oxides.

Still another object is to provide a process for the use of an intermetallic compound particularly useful in the present invention.

Additional objects and advantages of the present invention will be apparent to those of ordinary skill in the art by reference to the following description in drawings wherein:

BRIEF DESCRIPTION OF THE DRAWINGS

FIG. 1 is a partially cutaway schematic drawings of an apparatus useful for practicing the process of the present invention; FIG. 3 is a graph showing the amount of hydrogen sorbed (in terms of H.P.U., to be explained later) as a function of the weight gain for the same alloys and temperatures as for FIG. 2.

DESCRIPTION OF THE INVENTION

Figure 2:
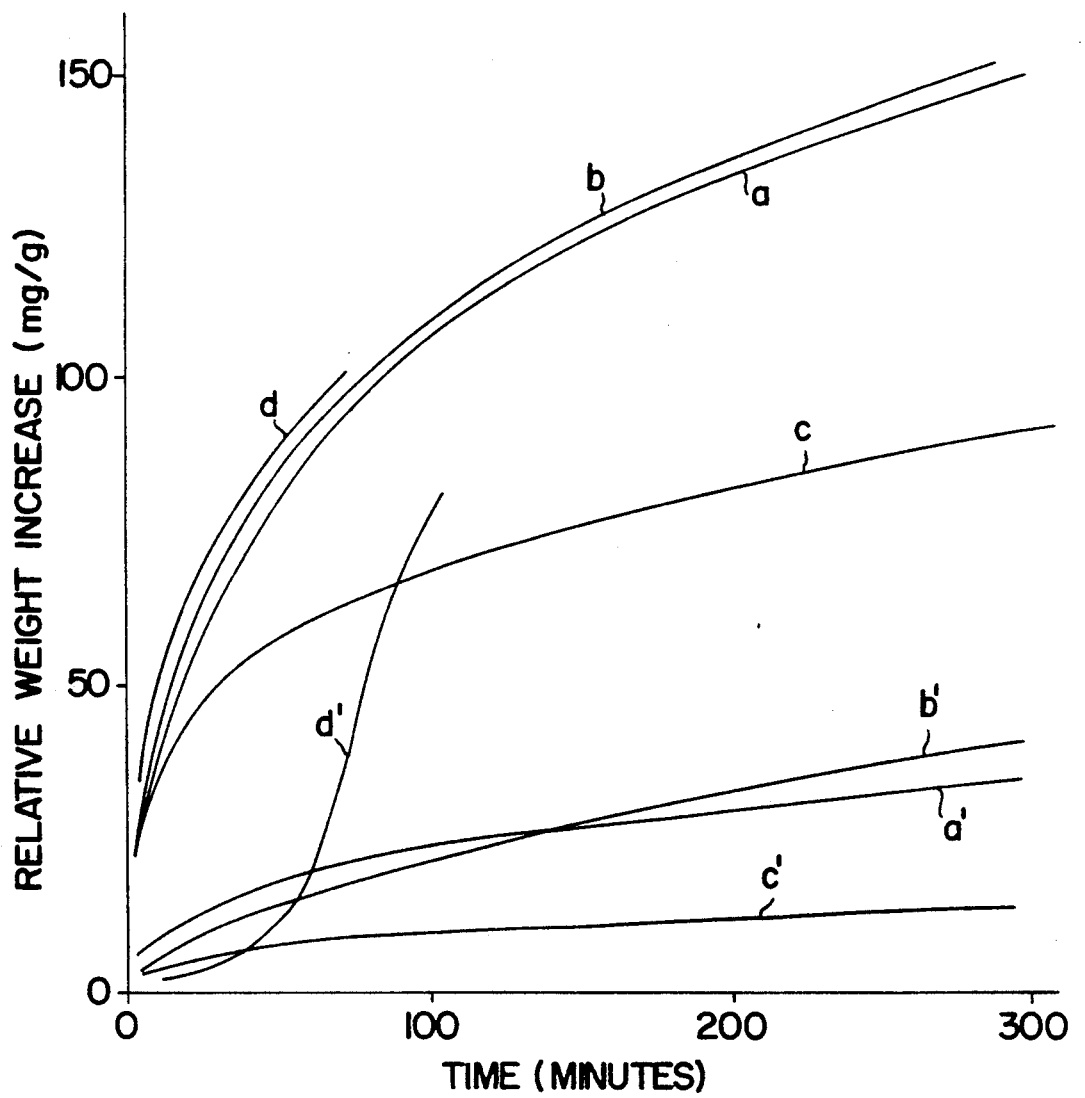
FIG. 2 is a graph of the amount of oxygen sorbed per amount of alloy as a function of time at two different temperatures for three different alloys used in the present invention and a fourth reference alloy $Zr_2Ni$ which represents the prior art.

According to the present invention there is provided an improved process for the recovery of tritium and deuterium from their oxides by reacting the oxides of tritium and the oxides of deuterium with an intermetallic compound having the general formula $ZrM_2$ in which M is any transition metal chosen from the Group Cr, Mn, Fe, Co or Ni or their mixtures, thus absorbing oxygen and liberating tritium and deuterium.

Surprisingly the present inventors have found that in reactions with water at temperatures above 200° C. the intermetallic compounds having a general formula $ZrM_2$, where M is any transition metal chosen from the group Cr, Mn, Fe, Co or their mixtures, absorb only oxygen and release hydrogen (or its isotopes).

The alloys used in the present invention are generally particulate. They generally have a size range of from 1 to 250 μm and preferably from 1 to 125 μm. They can be employed as simple powder; however the powders are generally compressed into shapes such has cylinders. The size of these cylinders is not critical. One useful size of cylinder has a diameter of 6 mm and a height of 4 mm. Other metals such as aluminium and/or copper can be admixed with the powder in amounts from about 5 to about 10 percent by weight as an aid in forming the cylinders.

The reaction between the alloy and the oxides of tritium (tritiated water, etc.) occurs over a wide temperature range. In general the higher the temperature, the faster the reaction. However as temperature increases there is an increasing tendency for $T_2$ to diffuse through the stainless steel walls of the vessel containing the alloy. In general temperatures of from 200° to 700° C. are useful. Temperatures of from 300° to 550° C. are preferred.

The invention may be better understood by reference to the following examples wherein all parts and percentages are by weight unless otherwise indicated. These examples are designed to teach those skilled in the art how to practice the invention and to represent the base mode presently known for practicing the present invention.

EXAMPLE 1

This example illustrates the manufacture of ZrMnFe according to the present invention.

The following quantities of the following ingredients are combined as indicated:

| Item | Ingredient | Quantity (grams) |
|---|---|---|
| A | Zr | 22.69 |
| B | Mn | 13.66 |
| C | Fe | 13.65 |
| Total | | 50.00 |

Items A, B, and C, having an average particle size of about 3 to 5 mm are charged to a copper receptacle on the water-cooled base of an arc melting furnace. The pressure in the furnace is reduced to $10^{-4}$ mbar. Argon is admitted to the vacuum furnace until the pressure increases to about 500 mbar. An arc is established between the tungsten electrode and the charge in the receptacle at about 40 volts. This arc melts the charge. The charge is permitted to cool under the influence of the water-cooled base. The charge is turned over and remelted by the arc. This process is repeated until the charge has been melted a total of 4 times.

The ingot thus produced is removed from the furnace and ground to an average particle size of less than 125 μm. It is the intermetallic compound ZrMnFe.

A sample of about 0.1 g of the powder is then compressed into a metallic annular container, forming a gettering device which is used for the sorption tests described later.

EXAMPLE 2

This example illustrates the manufacture of $ZrMn_2$ useful in the present invention.

The procedure of example 1 was repeated except that the Fe ws emitted and the following quantities of Zr and Mn were employed.

| Item | Ingredient | Quantity (grams) |
|---|---|---|
| A | Zr | 27.22 |
| B | Mn | 32.78 |
| Total | | 60.00 |

The resultant ingot consists essentially of the intermetallic compound $ZrMn_2$.

EXAMPLE 3

This example illustrates the manufacture of $ZrCr_2$ useful in the present invention.

The procedure of example 1 was repeated except that the Mn and Fe have replaced by Cr. The following quantities of Zr and Cr were empolyed.

| Item | Ingredient | Quantity (grams) |
|---|---|---|
| A | Zr | 23.37 |
| B | Cr | 26.63 |
| Total | | 50.00 |

The resultant ingot consists essentially of $ZrCr_2$.

Referring now to the drawings in general and in particular to FIG. 1 there is shown an apparatus 10 useful for practicing the process of the present invention. The apparatus 10 comprises a vessel 12 containing cylinder 14, 14' of powdered alloy useful in the present invention. An inlet conduit is in fluid communication with the vessel 12. The inlet conduit 16 is provided with valves 18, 20. The apparatus 10 has an outlet conduit 22 in a fluid communication with the vessel 12. The outlet conduit 22 has valves 24, 26. Joining the inlet conduit 16 and the outlet conduit 22 is a bypass 28 containing a valve 30.

In operation the valve 30 is closed and the valves 18, 20, 24, 26 are open. The gas stream enters the conduit 18 in the direction of the arrow 32. The gas stream enters the vessel 12 and contacts the alloy of the cylinders such as the cylinders 14, 14'. Chemical reactions of the type $T_2O + G$ $G - O + T_2$ take place where G is an intermetallic compound according to the present invention and G−O is the product of its reaction with oxygen. When the alloy has fully reacted with oxygen, the cylinders such as the cylinders 14, 14' can be removed from the vessel 12 through an opening (not shown). The vessel can then be reloaded with fresh alloy.

In order to avoid any interruption in the gas stream during such operation, a second parallel vessel with the respective values can be connected to the conduit and used in turn with the first one.

With reference now to FIG. 2 there is shown the sorption of $H_2O$ by each of the three alloys expressed as an increase in weight of the getter device as a function of time at a total pressure of 4.6 torr (6 mbar) at 300° and 400° C.

In FIG. 3 are shown graphs of the H.P.U. (the hydrogen pick up corresponds to the percentage of hydrogen that the getter sorbs) at 300° and 400° C. as a function of the quantity of $H_2O$ sorbed expressed as the weight increase of the getter.

In FIGS. 2 and 3 the three alloys of Examples 1, 2 and 3 are indicated with the letters a, b and c respectively. The letter d indicates the curves for $Zr_2Ni$ claimed as a water getter in U.S. Pat. No. 4,071,325.

Comparing the curves of FIG. 2 one can see that all the alloys have good water sorption characteristics.

From the curves of FIG. 3 it can be seen that while the $Zr_2Ni$ alloy (d) shows a hydrogen pick up (HPU) value which is rather high, greater than 50%, the alloys of the present invention, after a brief initial period, release hydrogen almost completely (H.P.U. $\leq 10\%$), as is required for the application.

Even though the invention has been described in considerable detail with reference to certain preferred embodiments designed to teach those skilled in the art how bet to practice the invention, it will be realized that other modifications may be employed without departing from the spirit and scope of the appended claims.

What is claimed is:

1. A process for the recovery of tritium and deuterium from their oxides characterized by reacting oxides of tritium and oxides of deuterium with an intermetallic compound of the formula, $ZrM_2$ where M is any transition metal selected from the group consisting of Cr, Mn, Fe, Co, Ni and mixtures thereof, thereby sorbing oxygen and releasing tritium and deuterium.

2. The process of claim 1 therein the reacting occurs at 200° to 700° C.

3. The process of claim 1 wherein the reacting occurs at 300° to 550° C.

4. A process for the recovery of tritium and deuterium from their oxides characterized by reacting oxides of tritium and oxides of deuterium with an intermetallic compound of the formula: $ZrMn_2$ thereby sorbing oxygen and releasing tritium and deuterium.

5. The process of claim 1 wherein the intermetallic compound is $ZrCr_2$.

6. The process of claim 1 wherein the intermetallic compound is ZrMnFe.

7. A process for the purification of an impure stream of tritium contaminated with oxides of deuterium and contaminated with oxides of tritium, comprising the steps of:
  I. contacting the impure stream with an intermetallic compound of the formula $ZrM_2$ where M is any transition metal selected from the group consisting of Cr, Mn, Fe, Co, Ni and mixtures thereof; and
  II. forming oxides from the intermetallic compound and from the oxygen of the oxides of tritium and from the oxygen of the oxides of deuterium; and
  III. returning tritium and deuterium to the gas stream.

8. The process of claim 7 wherein the impure stream has a pressure less than one mbar.

9. The process of claim 7 wherein the impure stream has a pressure less than about ten mbar.

10. The process of claim 7 wherein the partial pressure of oxides of tritium and deuterium is less than about 65 mbar.

11. The process of claim 7 wherein the contacting occurs at 200° to 700° C.

12. The process of claim 7 wherein the contacting occurs at 300° to 550° C.

* * * * *